US005608429A

United States Patent [19]

Hayashihara et al.

[11] Patent Number: 5,608,429

[45] Date of Patent: Mar. 4, 1997

[54] LASER MARKING METHOD, LASER MARKING COMPOSITION AND ARTICLES HAVING COLOR DEVELOPING LAYER MADE OF SAID COMPOSITION

[75] Inventors: Shoiti Hayashihara; Masaki Shinmoto, both of Yono, Japan

[73] Assignees: Nippon Kayaku Kabushiki Kaisha, Tokyo; Kansai Paint Kabushiki Kaisha, Amagasaki, both of Japan

[21] Appl. No.: 281,363

[22] Filed: Jul. 27, 1994

[30] Foreign Application Priority Data

Aug. 2, 1993 [JP] Japan .................................... 5-208156

[51] Int. Cl.$^6$ ............................ B41J 2/005; C09D 11/00

[52] U.S. Cl. ........................................ 346/135.1; 428/532

[58] Field of Search ......................... 346/135.1; 428/532; 503/200

[56] References Cited

U.S. PATENT DOCUMENTS

| | | | |
|---|---|---|---|
| 4,510,512 | 4/1985 | Okamoto et al. | 346/209 |
| 4,788,128 | 11/1988 | Barlow | 430/200 |
| 5,035,983 | 7/1991 | Kiyonari et al. | 430/346 |
| 5,413,629 | 5/1995 | Yasui et al. | 106/21 |

FOREIGN PATENT DOCUMENTS

| | | |
|---|---|---|
| 0439369 | 7/1991 | European Pat. Off. . |
| 0600441 | 6/1994 | European Pat. Off. . |
| 0607597 | 7/1994 | European Pat. Off. . |
| 55-30943 | 3/1980 | Japan . |
| 55-8031 | 3/1993 | Japan . |

OTHER PUBLICATIONS

Patent Abstracts of Japan, unexamined applications, M. Section, vol. 17, No. 368, Jul. 12, 1993, JP 05-58031.

Patent Abstracts of Japan, unexamined applications, C section, vol. 17, No. 309, Jun. 14, 1993, JP 05-25317.

*Primary Examiner*—Valerie Lund
*Attorney, Agent, or Firm*—Nields & Lemack

[57] ABSTRACT

This invention relates to a laser marking method which comprises coating a laser marking composition containing as essential components a color former, a color developer and an inorganic compound having the absorption peak on the infrared absorption spectrum in the region of 900–1,000 $cm^{-1}$ on a substrate to form a color developing layer, and irradiating laser light to the color developing layer; the laser marking composition; and articles having a color developing layer made of the laser marking composition. The method of this invention is capable of forming a mark with vivid color development even when the color developing layer is a thin film of less than 5 μm in thickness or when marking is carried out at high speed.

11 Claims, No Drawings

LASER MARKING METHOD, LASER MARKING COMPOSITION AND ARTICLES HAVING COLOR DEVELOPING LAYER MADE OF SAID COMPOSITION

FIELD OF THE INVENTION

The present invention relates to a laser marking method, a laser marking composition and articles having a color developing layer made of said composition.

BACKGROUND OF THE INVENTION

A thermosensitive recording medium designed to form a color image by melting and contacting a color former with a developer and making use of a color reaction by the two substances is known. For carrying out recording with such a thermosensitive recording medium, a recording system is generally employed in which the recording medium is run with its color developing layer in close attachment with a recording head (thermal head) having a heat generating element. In operation of such recording system, however, there are involved various problems such as wear of the head, adhesion of tailings to the head surface and sticking of the head with the color developing layer of the recording medium. Further, since the recording speed depends on the heat dissipation time of the thermal head, it is hardly possible to carry out high-speed printing and also there is a limitation to the resolution of the color image formed by diffusion of heat.

Recently, for real-time marking of letters and signs such as maker's name, product name, date of production, lot number, etc., on the surfaces of various commercial articles, for example, electronic parts such as IC's, resistors, condensers, inductors, etc., electrical parts such as relays, switches, connectors, printed circuit boards, etc., housings of the electrical devices, automobile parts, machine parts, cables, sheets, packaging sheets, cards, various containers of foods and medicines, caps of containers, etc., the laser marking system is popularly employed for its various advantages such as high speed printing, capability of fine marking, etc. Such laser marking system is essentially based on the principle that marking is made by breaking, that is, laser light is applied to the necessary part alone of the substrate surface to cause denaturing or removal of said part of the substrate, or laser light is applied to the coating film formed on the substrate surface to remove the coating film alone, so as to produce a contrast between the laser irradiated portion and the non-irradiated portion of the substrate.

When this laser marking method is applied to said color former and developer combination system, it may happen that break takes place even in the substrate to make it unable to perform desired marking. Also, when it is tried to lower the laser energy so as to prevent undesired break of the color developing part or the substrate, there arises the problem that the formed color image may fail to have the enough color density since the amount of energy applied per shot becomes less than 1.0 j/cm$^2$ especially in case the color developing layer is very small in thickness, such as less than 5 μm, or in case marking is carried out at a high speed of 30–40 shots/sec.

The present invention is aimed at providing a laser marking method using a color developing system comprising a color former and developer combination, which method is capable of non-break marking with clear and vivid color formation even when the color developing layer is a thin film of less than 5 μm in thickness or when marking is carried out at high speed.

SUMMARY OF THE INVENTION

The intensive studies by the present inventors for overcoming the prior art problems such as mentioned above have led to the attainment of the present invention.

According to the present invention, there are provided the followings:

(1) A laser marking method characterized in that a composition containing as essential components a color former, a color developer and an inorganic compound having the absorption peak on the infrared absorption spectrum in the region of 900–1,000 cm$^{-1}$ is irradiated on a substrate to form a color developing layer, and this layer is exposed to laser light.

(2) A laser marking method as set forth in (1) above, wherein the inorganic compound having the absorption peak on the infrared absorption spectrum in the region of 900–1,000 cm$^{-1}$ is aluminum hydroxide.

(3) A laser marking method as set forth in (1) or (2) above, wherein the ratio of the inorganic compound to the overall amount of the solid matter of the composition described in (1) above is 5–40% by weight.

(4) A laser marking method as set forth in any of (1) to (3) above, wherein the substrate is a sheet.

(5) A laser marking method as set forth in (4) above, wherein the sheet is paper or film.

(6) A laser marking method as set forth in (1) above, wherein the thickness (after drying) of the color developing layer is 1–15 μm.

(7) A laser marking method as set forth in (1) above, wherein laser light is infrared laser light.

(8) A laser marking composition containing as essential components a color former, a color developer and an inorganic compound having the absorption peak on the infrared absorption spectrum in the region of 900–1,000 cm$^{-1}$.

(9) An article having a color developing layer made of a laser marking composition set forth in (8) above.

(10) An article as set forth in (9) above, wherein the thickness of the color developing layer is 1–15 μm.

(11) An article as set forth in (9) or (10) above, said article being a label or a packaging material.

DETAILED DESCRIPTION OF THE INVENTION

The composition (laser marking composition) used in the present invention contains as essential components a color former, a color developer and an inorganic compound having the absorption peak on the infrared absorption spectrum in the region of 900–1,000 cm$^{-1}$. The color former and the color developer used in the present invention are not specified and any of those usually used for thermosensitive recording media can be employed.

Examples of the color formers usable in the present invention include triallylmethane phthalide type dyes such as 3,3'-bis(p-dimethylaminophenyl)-6-dimethyl aminophthalide, 3-(p-dimethylaminophenyl)-3-(1,2-dimethylindole-3-yl) phthalide, 3,3'-bis(1,2-dimethylindole-3-yl)-5-dimethyl aminophthalide and 3-p-dimethylaminiphenyl-3-(1-methylpyrrole-3-yl)-6-diethyl aminophthalide; diphenylmethane type dyes such as 4,4'-bisdimethylaminobenzohydrylbenzyl ether and N-halophenylleucoauramine; thiazine type dyes such as benzoylleucomethylene blue; spiro type dyes such as 3-methyl-naphtho (6'-methoxybenzo)spiropyran, 3-benzyl-spiro-dinaphthopyran, etc.; lactam type dyes such as rhodamine B anilinolactam and rhodamine (o-chloroanilino)lactam; and fluoran type dyes such as 3-diethylamino-7-o-fluoroanilinofluoran, 3-dimethylamino-7-o-fluoroanilinofluoran, 3-diethylamino-7-o-chloroanilinofluoran, 3-diethylamino-7-p-chloroanilinofluoran, 3-diethylamino-7-dibenzylaminofluoran, 3-(N-cyclohexyl-N-methylamino)-6-methyl-7-phenylaminofluoran, 3-diethylamino-6-methyl-7-phenylaminofluoran and 3-dibutylamino-6-methyl-7-phenylaminofluoran. Of these color formers, the fluoran type dyes are preferred.

Examples of the color developers usable in the present invention include bisphenols such as 4,4'-sulfonyldiphenol, bis-(3-allyl-4-hydroxyphenyl)sulfone, 2,2',6,6'-tetramethyl-4,4'-sulfonyldiphenol, 2,2',6,6'-tetrabromo-4,4'-sulfonyldiphenol, 4,4'-isopropylidenediphenol, bis-(p-hydroxyphenyl)methane and 1,1-bis-(p-hydroxyphenyl)cyclohexane; monophenols such as p-octylphenol, p-phenylphenol and 4-(4'-isopropoxyphenyl)sulfonylphenol; aromatic carboxylic acid derivatives such as benzyl p-hydroxybenzoate, dimethyl 4-hydroxyphthalate, diethyl 5-hydroxyisophthalate, 3,5-di-tertbutylsalicylic acid, salicylic acid and benzyl β-hydroxynaphthalenecarboxylate; polyvalent metal salts of carboxylic acids; novolak type phenol resins; and inorganic acidic materials such as activated clay, acidic clay, attapulgite and aluminum silicate. Of these color developers, bisphenols are most preferred.

Phenol polymers are also preferred for use as color developer in the present invention. Examples of such phenol polymers include poly-p-vinylphenols such as p-vinylphenol homopolymers (MARUKALYNCUR M produced by Maruzen Sekiyu KK), p-vinylphenol and 2-hydroxyethyl methacrylate copolymer (MARUKALYNCUR CHM produced by Maruzen Sekiyu KK), p-vinylphenol and methyl methacrylate copolymer (MARUKALYNCUR CMM produced by Maruzen Sekiyu KK), bromides of p-vinylphenol (MARUKALYNCUR MB produced by Maruzen Sekiyu KK), p-vinylphenol and styrene copolymer (MARUKALYNCUR CST produced by Maruzen Sekiyu KK), p-vinylphenol and phenylmaleimide copolymer, p-vinylphenol and maleic acid copolymer and p-vinylphenol and fumalic acid copolymer (these polymers are the products by Maruzen Sekiyu KK), dicyclopentadiene and phenol copolymer, dicyclopentadiene and cresol copolymer, dicyclopentadiene and diphenol copolymer, and phenolaralkyls (such as MIREX XL produced by Mitsui-Toatsu Chemicals Inc.).

As for the inorganic compound having the absorption peak on the infrared absorption spectrum in the region of 900–1,000 $cm^{-1}$ used in the present invention, it is possible to employ any of those which show an absorption peak in the above-defined region, regardless of the intensity of absorption. Examples of such inorganic compounds include aluminum hydroxide, wollastonite, bentonite, hydrous silica, calcium silicate, talc, kaolin and clay. Aluminum hydroxide is specifically preferred. These inorganic compounds may be used as a mixture of two or more of them.

The ratios, relative to each other, of the color former, the color developer and the inorganic compound having an absorption peak on the infrared absorption spectrum in the region of 900–1,000 $cm^{-1}$ in the composition of the present invention are not specified but can be properly selected according to the type of the color former, the color developer and the inorganic compound used. Usually, however, the color developer is used in a ratio of preferably 1–50 parts by weight, more preferably 1.5–10 parts by weight, and the inorganic compound in a ratio of preferably 1–50 parts by weight, more preferably 1.5–10 parts by weight, to one part by weight of the color former. As for the proportions of said components in the laser marking composition of the present invention, the color former is 5–30% by weight, preferably 10–25% by weight, more preferably 10–20% by weight, the color developer is 10–60% by weight, preferably 20–50% by weight, more preferably 30–45% by weight, and the inorganic compound is 5–40% by weight, preferably 10–30% by weight, more preferably 15–25% by weight (15–20% by weight is economical), based on the overall amount of the solid matter in the composition.

In the composition of the present invention, there may be added a binder and various kinds of auxiliaries for facilitating coating of the composition on the substrate. Examples of the binders usable in this invention include starches, hydroxyethyl cellulose, methyl cellulose, carboxymethyl cellulose, gelatin, casein, gum arabic, polyvinyl alcohol, styrene-maleic anhydride copolymer salts, styrene-acrylic acid copolymer salts, styrene-acrylic ester copolymer emulsion, styrene-acrylic ester-acrylic acid copolymer emulsion, styrene-butadiene copolymer emulsion, styrene-butadienemaleic anhydride-acrylic ester copolymer emulsion and the like. The binder is added in an amount of about 2 to 40% by weight, preferably about 5 to 25% by weight, based on the overall amount of the solid matter in the composition.

The auxiliaries usable in the composition of this invention include dispersants such as sodium dioctylsulfosuccinate, sodium dodecylbenzenesulfonate, sodium salts of lauryl alcohol sulfurates and fatty acid metal salts; ultraviolet ray absorbers such as benzophenone type and triazole type; opacifying agents such as titanium oxide; defoaming agents, fluorescent dyes, and colorants. Further, in the composition of the present invention, higher fatty acid amides such as stearic acid amides, animal waxes such as beeswax and shellac wax, vegetable waxes such as carnauba wax, mineral waxes such as montan wax, paraffin wax, petroleum wax, higher fatty acid esters, chlorinated paraffin, synthetic paraffin, acetoacetic anilides, diphenylamines, carbazoles, fatty acid anilides, carboxylic acid esters such as dimethyl terephthalate and diphenyl phthalate, sulfonic acid amides such as benzenesulfonic acid anilide, sulfonic acid esters such as p-toluene sulfonic acid phenoxy ethyl ester and benzenesulfonic acid phenyl ester, diphenylsulfones such as bis-(4-allyloxyphenyl)sulfone and bis-(4-pentylphenyl)sulfone, naphthol derivatives such as 1-benzyloxynaphthalene and 2-benzoyloxynaphthalene, urea derivatives such as N-stearylurea, diketone compounds such as 4-acetylacetophenone and octadecane-2,17-dione, ethers such as 1,2-m-cresyloxyethane and others can be properly used as sensitizer.

The substrate used in the present invention is not specified and may comprise paper, synthetic resins, metals and such, but a sheet-like substrate is preferred. For example, paper, synthetic paper, synthetic resin film, metallized paper, metallized synthetic paper, metallized film and the like can be properly used.

The laser marking composition of the present invention can be obtained by mixing a color former, a color developer and an inorganic compound having the absorption peak on the infrared absorption spectrum in the region of 900–1,000 $cm^{-1}$ as essential components and, if necessary, further mixing a binder and various kinds of auxiliaries such as mentioned above, preferably after subjecting them severally to an atomizing treatment. For facilitating mixing, a dispersion medium such as water may be used.

The laser marking method of the present invention comprises dispersing the component materials of the composition of this invention in water while dissolving a binder therein to prepare a coating solution, applying this coating solution on a substrate, drying the coating to form a color developing layer, and irradiating laser light to this color developing layer.

In preparation of the coating solution, a color former and a developer are dispersed together or separately by a dispersing device such as ball mill, attritor, sand grinder or the like, usually using water as dispersing medium. An inorganic compound having the absorption peak on the infrared absorption spectrum in the region of 900–1,000 $cm^{-1}$ may be dispersed along with the color former and the developer, or it may be separately added to the coating solution of the color former and/or the developer after dispersion by said dispersing device. The average particle size of the dispersed color former, developer and inorganic compound of the present invention is usually less than 2 μm, preferably less than 1 μm. The additives are also similarly dispersed. The average particle size of the additives is usually less than 2 μm, preferably less than 1 μm, as in the case of the color former and the developer.

The way of application of the coating solution on the substrate is not defined but various known techniques can be employed for such coating operation. For example, the coating solution may be applied on a support by using an appropriate coating apparatus such as air knife coater, blade coater, gravure printer, etc. Gravure printing is preferably employed in case the composition of this invention is applied to label printing. The thickness of the coating film (color developing layer) formed after coating and drying is also not defined, but preferably it is in the range of 1 to 15 μm. In label marking, the coating film thickness is preferably about 1 to 5 μm, more preferably about 2 to 4 μm. In order to prevent discoloration of the color developed portion, a protective film may be formed on said coating by using a high-molecular weight compound capable of forming a film, such as an aqueous and/or solvent type overprint varnish, polyvinyl alcohol, acrylic emulsion or the like.

There are a diversity of articles having a color developing layer made of the composition of the present invention, such articles including, for example, labels, packaging paper, packaging films, packaging articles such as paper-made or plastic packaging containers, and paper-made, plastic or metallic cans.

The laser light to be applied to the color developing layer is preferably pulse type laser with an output of 0.4 $J/cm^2$·pulse or above, preferably 0.5 $J/cm^2$·pulse or above, or scanning type laser with an output of 0.4 $J/cm^2$ or above. The types of laser usable in this invention include carbon dioxide laser, YAG laser, excimer laser, etc., but an infrared laser such as TEA carbon dioxide laser is preferred.

The present invention is further illustrated with reference to the examples. It is to be understood, however, that the present invention is in no way limited by these examples. In the examples, the term "parts" means "parts by weight".

REFERENTIAL EXAMPLE 1

A mixture consisting of 33.5 parts of 3-diethylamino-7-o-fluoroanilinofluoran, 50.0 parts of a 10% polyvinyl alcohol aqueous solution and 16.5 parts of water was subjected to dispersion treatment by a sand grinder for 2 hours to prepare a dispersion (A) of a color former having an average particle size of about 0.8 μm.

REFERENTIAL EXAMPLE 2

A mixture consisting of 35.0 parts of 3-dibutylamino-6-methyl-7-phenylaminofluoran, 50.0 parts of a 10% polyvinyl aqueous alcohol solution and 15.0 parts of water was subjected to dispersion by a sand grinder for 2 hours to prepare a dispersion (B) of a color former having an average particle size of about 0.8 μm.

REFERENTIAL EXAMPLE 3

A mixture consisting of 40 parts of bis-(3-allyl-4-hydroxyphenyl)sulfone, 50 parts of 10% polyvinyl alcohol aqueous solution and 10 parts of water was subjected to dispersion by a sand grinder for 2 hours to prepare a dispersion (C) of a color developer having an average particle size of about 0.8 μm.

REFERENTIAL EXAMPLE 4

A mixture consisting of 40 parts of 4-p-isopropyloxyphenylsulfonylphenol, 50 parts of 10% polyvinyl alcohol aqueous solution and 10 parts of water was subjected to dispersion by a sand grinder for 2 hours to prepare a dispersion (D) of a color developer having an average particle size of about 0.8 μm.

REFERENTIAL EXAMPLE 5

A mixture consisting of 60 parts of aluminum hydroxide and 40 parts of 12.5% polyvinyl alcohol aqueous solution was subjected to dispersion by a sand grinder for 2 hours to prepare a dispersion (E) of aluminum hydroxide having an average particle size of about 1 μm.

REFERENTIAL EXAMPLE 6

A mixture consisting of 50.0 parts of titanium oxide and 50.0 parts of a 10% polyvinyl alcohol aqueous solution was subjected to dispersion by a sand grinder for 2 hours to prepare a titanium oxide dispersion (F).

REFERENTIAL EXAMPLE 7

A mixture consisting of 35.0 parts of 3-diethylamino-7-o-chloroanilinofluoran, 50.0 parts of a 10% polyvinyl alcohol aqueous solution and 15 parts of water was subjected to dispersion by a sand grinder for 2 hours to prepare a dispersion (G) of a color former having an average particle size of about 0.8μ.

REFERENTIAL EXAMPLE 8

A mixture consisting of 35.0 parts of 2,2',6,6'-tetramethyl-4,4'-diphenolsulfone, 50.0 parts of a 10% polyvinyl alcohol aqueous solution and 15 parts of water was subjected to dispersion by a sand grinder for 2 hours to prepare a dispersion (D) of a color developer having an average particle size of about 0.8μ.

REFERENTIAL EXAMPLE 9

A mixture consisting of 35.0 parts of 2,2',6,6'-tetrabromo-4,4'-diphenolsulfone, 50.0 parts of a 10% polyvinyl alcohol aqueous solution and 15 parts of water was subjected to dispersion by a sand grinder for 2 hours to prepare a dispersion (I) of a color developer having an average particle size of about 0.8μ.

REFERENTIAL EXAMPLE 10

A mixture consisting of a bromide of poly-p-vinylphenol (MARUKALYNCUR MB produced by Maruzen Sekiyu Kagaku KK, softening point: 210° C.), 50.0 parts of a 10% polyvinyl alcohol aqueous solution and 15 parts of water was subjected to dispersion by a sand grinder for 2 hours to prepare a dispersion (J) of a color developer having an average particle size of about 0.8μ.

EXAMPLE 1

Dispersion (A), dispersion (C), dispersion (E) and a 40% ethylene-acrylic ester-acrylic acid copolymer emulsion were mixed in a ratio of 2.4:5.5:2.0:1.0 to form a coating solution of a marking composition, and this coating solution was coated on an aluminum deposited paper by a No. 3 bar coater and dried at 50° C. to obtain a test specimen having an approximately 3 μm thick color developing layer.

EXAMPLE 2

Dispersion (A), dispersion (C), dispersion (E) and a 40% ethylene-acrylic ester-acrylic acid copolymer emulsion were mixed in a ratio of 2.4:5.5:2.0:1.0 to form a coating solution of a marking composition. This coating solution was coated on an aluminum deposited paper by a No. 3 bar coater and dried at 50° C. to form an approximately 3 μm thick color developing layer, and an acrylate-based over print vanish was coated thereon to a thickness of about 2 μm to make a test specimen.

type carbon dioxide laser (BLAZAR 6000 produced by Laser Technics Co., Ltd.), and the vividness of the formed marks was evaluated. The results are shown in Table 2.

TABLE 1

| | Color former | Color developer | Inorganic compound | Others | Binder* | Water |
|---|---|---|---|---|---|---|
| Example | | | | | | |
| 1 | (A): 2.4 | (C): 5.5 | (E): 2.0 | | 1.0 | |
| 2 | (A): 2.4 | (C): 5.5 | (E): 2.0 | | 1.0 | |
| 3 | (B): 2.0 | (C): 3.0 | (E): 2.0 | | 1.0 | 0.4 |
| 4 | (A): 4.8 | (C): 5.5 | (E): 3.0 | | 1.5 | |
| 5 | (B): 2.4 | (D): 5.5 | (E): 0.5 | | 1.0 | 1.1 |
| 6 | (A): 2.4 | (C): 5.5 | (E): 1.5 | | 1.0 | 0.5 |
| 7 | (A): 2.4 | (H): 5.5 | (E): 4.0 | (F): 2.0 | 1.0 | |
| 8 | (A): 2.4 | (I): 5.5 | (E): 4.0 | (F): 2.0 | 1.0 | |
| 9 | (G): 2.4 | (I): 5.5 | (E): 4.0 | (F): 2.0 | 1.0 | |
| 10 | (G): 2.4 | (C): 5.5 | (E): 2.0 | (F): 1.0 | 1.0 | |
| 11 | (A): 2.4 | (C); 5.5 | (E): 2.0 | (F): 1.0 | 1.0 | |
| 12 | (A): 2.4 | (J): 5.5 | (E): 3.0 | (F): 1.0 | 1.0 | |
| Comp. Example 1 | (A): 2.4 | (C): 5.5 | | | 1.0 | |

*: Styrene-acrylic ester-acrylic acid copolymer

TABLE 2

| Laser energy | Example 1 | 2 | 3 | 4 | 5 | 6 | 7 | 8 | 9 | 10 | 11 | 12 | Comp. Example 1 |
|---|---|---|---|---|---|---|---|---|---|---|---|---|---|
| 0.5 J/cm² · pulse | ⊙ | ⊙ | ⊙ | ⊙ | ⊙ | ⊙ | o | o | o | ⊙ | ⊙ | o | x |
| 0.6 J/cm² · pulse | ⊙ | ⊙ | ⊙ | ⊙ | ⊙ | ⊙ | ⊙ | ⊙ | ⊙ | ⊙ | ⊙ | ⊙ | x |
| 0.8 J/cm² · pulse | ⊙ | ⊙ | ⊙ | ⊙ | ⊙ | ⊙ | ⊙ | ⊙ | ⊙ | ⊙ | ⊙ | ⊙ | Δ |
| 1.0 J/cm² · pulse | ⊙ | ⊙ | ⊙ | ⊙ | ⊙ | ⊙ | ⊙ | ⊙ | ⊙ | ⊙ | ⊙ | ⊙ | Δ~o |

EXAMPLES 3-12

The respective dispersions were mixed in the ratios shown in Table 1 in accordance with Example 1 to prepare the coating solutions of the marking compositions, and these coating solutions were coated on an aluminum deposited paper by a No. 3 bar coater and dried at 50° C. to make the test specimens having an approximately 3 μm thick color developing layer. The figures in Table 1 are weight parts.

COMPARATIVE EXAMPLE 1

Dispersions (A) and (C) were mixed in a ratio of 2.4:5.5 to prepare a coating solution of a marking composition, and this coating solution was coated on an aluminum deposited paper by a No. 3 bar coater and dried at 50° C. to make an approximately 3 μm thick test specimen.

TEST RESULTS

Each of the test specimens obtained in Examples 1-12 and Comparative Example 1 was exposed to one shot of laser beams with various levels of energy by using a pulse The vividness of the developed color was judged according to the following criterion:

x: No development of color.

Δ: Only slight development of color.

o: Good state of color development.

⊙: Vivid color development.

There has been developed a laser marking method using a color developing system consisting of a color former and a color developer, which method is capable of no-break marking with vivid color development even when the color developing layer is a thin film of less than 5 μm in thickness or when the energy of the laser beams applied is low (when marking is carried out at high speed).

What is claimed is:

1. A laser marking composition wherein an inorganic compound has an absorption peak on the infrared absorption spectrum in the region of 900–1,000 cm$^{-1}$, containing as essential components a color former, a color developer and aluminum hydroxide as said inorganic compound having said absorption peak on said infrared absorption spectrum in the region of 900–1,000 cm$^{-1}$.

2. A laser marking method in which an inorganic compound is used having an absorption peak on the infrared absorption spectrum in the region of 900–1,000 $cm^{-1}$, which method comprises coating a composition containing as essential components a color former, a color developer and aluminum hydroxide as said inorganic compound having said absorption peak on said infrared absorption spectrum in said region of 900–1,000 $cm^{-1}$ on a substrate to form a color developing layer, and irradiating laser light to said color developing layer.

3. The laser marking method according to claim 1, wherein said composition has an overall amount of solid matter, and wherein the ratio of said inorganic compound to said overall amount of solid matter of said composition set forth in claim 1 is 5–40% by weight.

4. The laser marking method according to any of claims 1 or 3, wherein the substrate is sheet-like.

5. The laser marking method according to claim 4, wherein the sheet-like substrate is paper or film.

6. The laser marking method according to claim 1, wherein said color former, said color developer, and said inorganic compound form a color developing layer, and wherein the thickness of said color developing layer is 1–5 μm.

7. The laser marking method according to claim 1, wherein the laser light is infrared laser light.

8. The laser marking method according to any one of claims 1 or 3, wherein said substrate is sheet-like paper or film.

9. An article having a color developing layer made of a laser marking composition wherein an inorganic compound has an absorption peak on the infrared absorption spectrum in the region of 900–1,000 $cm^{-1}$, containing as essential components a color former, a color developer and aluminum hydroxide as said inorganic compound having said absorption peak on said infrared absorption spectrum in the region of 900–1,000 $cm^{-1}$.

10. An article according to claim 9, wherein the thickness of the color developing layer is 1–15 μm.

11. An article according to claim 9 or 10, said article being a label or a packaging article.

* * * * *